US009686304B1

(12) United States Patent
Guo et al.

(10) Patent No.: US 9,686,304 B1
(45) Date of Patent: Jun. 20, 2017

(54) SYSTEMS AND METHODS FOR HEALING INFECTED DOCUMENT FILES

(71) Applicant: Symantec Corporation, Mountain View, CA (US)

(72) Inventors: Fanglu Guo, Los Angeles, CA (US); Susanta Nanda, Los Angeles, CA (US); Sandeep Bhatkar, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/025,779

(22) Filed: Sep. 12, 2013

Related U.S. Application Data

(60) Provisional application No. 61/839,363, filed on Jun. 25, 2013.

(51) Int. Cl.
*H04L 29/06* (2006.01)

(52) U.S. Cl.
CPC ................................ *H04L 63/1441* (2013.01)

(58) Field of Classification Search
CPC ............... H04L 63/145; H04L 63/0428; H04L 63/1441; G06F 21/56; G06F 21/566
See application file for complete search history.

(56) References Cited

U.S. PATENT DOCUMENTS

| 7,490,244 B1 | 2/2009 | Kennedy et al. |
| 8,060,577 B1 | 11/2011 | Conrad |
| 9,118,715 B2 * | 8/2015 | Staniford .............. H04L 63/145 |
| 2001/0005889 A1 | 6/2001 | Albrecht |
| 2003/0037302 A1 | 2/2003 | Dzienis |
| 2005/0273858 A1 | 12/2005 | Zadok et al. |
| 2006/0248442 A1 * | 11/2006 | Rosenstein ............. G06F 17/24 715/205 |
| 2006/0259948 A1 | 11/2006 | Calow et al. |

(Continued)

OTHER PUBLICATIONS

Pavel Laskov et al., "Static Detection of Malicious JavaScript-Bearing PDF Documents" Dec. 2011. pp. 373-382.*

(Continued)

*Primary Examiner* — Carl Colin
*Assistant Examiner* — Ghodrat Jamshidi
(74) *Attorney, Agent, or Firm* — FisherBroyles LLP

(57) ABSTRACT

A computer-implemented method for healing infected document files may include (1) receiving an electronic message directed to a target client computing system, the electronic message including a document file, (2) in response to receiving the electronic message, discovering, by a security program, that the document file is infected with potentially malicious content by, parsing the document file into separate objects and detecting that one of the separate objects is infected with potentially malicious content, (3) healing, by the security program, the infected object by removing the potentially malicious content from the object, (4) reconstructing, by the security program, the document file by reuniting the healed separate object with a remainder of the separate objects in a manner that preserves readability of the document, and (5) providing access to the readable reconstructed document file at the target client computing system. Various other methods, systems, and computer-readable media are also disclosed.

20 Claims, 7 Drawing Sheets

(56) References Cited

U.S. PATENT DOCUMENTS

| | | | |
|---|---|---|---|
| 2006/0288416 A1* | 12/2006 | Costea et al. | 726/24 |
| 2007/0100999 A1 | 5/2007 | Haider | |
| 2007/0204010 A1* | 8/2007 | Sah | G06Q 30/02 709/219 |
| 2009/0150419 A1 | 6/2009 | Kim et al. | |
| 2009/0187992 A1 | 7/2009 | Poston | |
| 2010/0251000 A1 | 9/2010 | Lyne et al. | |
| 2011/0125863 A1* | 5/2011 | Massand | 709/206 |
| 2012/0005756 A1 | 1/2012 | Hoefelmeyer et al. | |
| 2012/0047581 A1* | 2/2012 | Banerjee | G06F 21/554 726/24 |
| 2012/0331517 A1* | 12/2012 | Wilcox | 726/1 |
| 2013/0160127 A1 | 6/2013 | Jeong et al. | |
| 2013/0253976 A1* | 9/2013 | Shukla et al. | 705/7.26 |

OTHER PUBLICATIONS

Carey Nachenberg, et al; Systems and Methods for Neutralizing File-Format-Specific Exploits Included Within Files Contained Within Electronic Communications; U.S. Appl. No. 13/418,332, filed Mar. 12, 2012.

Ma, Jian-Yuan et al.; Suppress Malicious Scripts in Multimedia by File Format Conversion; ftp://ftp.scu.edu.tw/scu/network/tanet2011/TANet2011/%B3%CC%A8%CE%BD%D7%A4%E5/1102.pdf, as accessed on Jan. 17, 2012; Institute of Computer and Communication Engineering, Department of Electrical Engineering, National Cheng Kung University; Tainan, Taiwan.

Muir, John; No Time for Zero-Day Solutions; Trusted Strategies; http://www.trustedstrategies.com/papers/white_paper_zero_day_threats.pdf, as accessed on Dec. 15, 2011.

about.com; GFI Offers Trojan & Executable Analyzer—Tackles fast-growing threat posed by Trojans; http://antivirus.about.com/library/weekly/aa062303a.htm, as accessed on Dec. 15, 2011.

Needham, Roger et al.; Network Attack and Defense; Security Engineering: A Guide to Building Dependable Distributed Systems; pp. 367-390; http://www.cl.cam.ac.uk/~rja14/Papers/SE-18.pdf, as accessed on Dec. 15, 2011.

The Contemplation; Roku Channels; May 31, 2011; http://www.thecontemplation.com/index.php/2010/09/10/new-threataffecting-computersvia-email-attachment/, as accessed on Dec. 15, 2011.

Smutz, Charles et al., "Malicious PDF Detection using Metadata and Structural Features", http://cs.gmu.edu/~astavrou/research/Malicious_PDF_Detection_ACSAC_12.pdf, as accessed Jun. 24, 2013, ACSAC '12; ACM; Orlando, Florida, (Dec. 3-7, 2012), 239-248.

Srndic, Nedim et al., "Detection of Malicious PDF Files Based on Hierarchical Document Structure", http://www.ra.cs.uni-tuebingen.de/mitarb/srndic/srndic-laskov-ndss-2013.pdf, as accessed Jun. 24, 2013, 20th Annual Network and Distributed System Security Symposium (NDSS); San Diego, California, (Feb. 24-27, 2013).

Chiron, "How to Tell if a File is Malicious", http://www.techsupportalert.com/content/how-tell-if-file-malicious.htm, as accessed Jun. 24, 2013, (Jul. 18, 2010).

Engelberth, Markus et al., "Detecting malicious documents with combined static and dynamic analysis", http://www.virusbtn.com/pdf/conference_slides/2009/Willems-VB2009.pdf, as accessed Jun. 24, 2013, Virus Bulletin 200; Pi1—Laboratory for Dependable Distributed Systems; Universitat Mannheim; Geneva, (2009).

Nguyen, Anh Quynh "Detecting malicious documentation", http://www.coseinc.com/en/index.php?rt=download&act=publication&file=D-Analyzer.pdf, as accessed Jun. 24, 2013, SyScan 2010; Ho Chi Minh City, (Sep. 23, 2010).

Digiprove, "A Novel Way of Detecting Malicious PDF Documents", http://secdiary.com/article/novel-detection-malicious-pdf-javascript/, as accessed Jun. 24, 2013, The Security Diaries, (Mar. 17, 2012).

Sandeep Bhatkar, et al; Systems and Methods for Detecting Malicious Documents Based on Component-Object Reuse; U.S. Appl. No. 14/073,815, filed Nov. 6, 2013.

Jollans, Tony "Uncompressing Documents—VBA Project Storage", http://www.wordarticles.com/Articles/Formats/VBAStorage.php, as accessed Sep. 3, 2013, (Aug. 30, 2012).

Jollans, Tony "Uncompressing Documents—Old Format Documents", http://www.wordarticles.com/Articles/Formats/StructuredStorage.php, as accessed Sep. 3, 2013, (Aug. 30, 2012).

Maxey, Gregory K., "VBA Basics", http://gregmaxey.mvps.org/word_tip_pages/vba_basics.html, as accessed Sep. 3, 2013, (Jun. 10, 2013).

Microsoft Corporation, "[MS-OFCGLOS]: Microsoft Office Master Glossary", http://download.microsoft.com/download/1/6/F/16F4E321-AA6B-4FA3-8AD3-E94C895A3C97/[MS-OFCGLOS].pdf, as accessed Nov. 18, 2013, (Nov. 18, 2013).

Microsoft Corporation, "Delete a macro", http://office.microsoft.com/en-us/word-help/delete-a-macro-HA010099770.aspx, as accessed Sep. 3, 2013, (Jul. 11, 2010).

Microsoft Corporation, "Create or delete a macro", http://office.microsoft.com/en-us/excel-help/create-or-delete-a-macro-HP010342374.aspx, as accessed Sep. 3, 2013, (Jul. 3, 2010).

How to remove macros from binary MS Office documents?, http://stackoverflow.com/questions/7298765/how-to-remove-macros-from-binary-ms-office-documents, as accessed Sep. 3, 2013, Stack Overflow, (Sep. 4, 2011).

Microsoft Corporation, "Create, run, edit, or delete a macro", http://office.microsoft.com/en-us/mac-word-help/create-run-edit-or-delete-a-macro-HA102927318.aspx, as accessed Sep. 3, 2013, (2013).

Admin, "What Is a Macro Virus and How to Remove It", http://www.combofix.org/what-is-a-macro-virus-and-how-to-remove-it.php, as accessed Sep. 3, 2013, ComboFig.org, (2008).

extendoffice.com, "How to remove macros from document in Word?", http://www.extendoffice.com/documents/word/758-word-remove-macros.html, as accessed Sep. 3, 2013, (2009).

Susanta Nanda, et al.; Systems and Methods for Protecting Document Files from Macro Threats; U.S. Appl. No. 14/073,507, filed Nov. 6, 2013.

"Advanced Persistent Threats and Other Advanced Attacks: Threat Analysis and Defense Strategies for SMB, Mid-Size, and Enterprise Organizations", http://www.websense.com/assets/white-papers/whitepaper-websense-advanced-persistent-threats-and-other-advanced-attacks-en.pdf, as accessed Jun. 24, 2013, A Websense® White Paper, (2011).

"Mitigation Guidelines for Advanced Persistent Threats", https://web.archive.org/web/20120204003219/http://www.publicsafety.gc.ca/prg/em/ccirc/2011/tr11-002-eng.aspx, as accessed Jun. 24, 2013, No. TR11-002, Public Safety Canada, (Dec. 2, 2011).

Li, Frankie "A Detailed Analysis of an Advanced Persistent Threat Malware", http://www.sans.org/reading-room/whitepapers/malicious/detailed-analysis-advanced-persistent-threat-malware-33814, as accessed Jun. 24, 2013, SANS Institute InfoSec Reading Room, (Oct. 13, 2011).

Rede, Mike "A Guide to Converters and Viewers for Email Attachments", http://www.theemailadmin.com/2009/07/a-guide-to-converters-and-viewers-for-email-attachments/, as accessed Jun. 24, 2013, TheEmailADMIN, (Jul. 29, 2009).

"Saving and Viewing E-mail Attachments in Microsoft Outlook", http://www.dummies.com/how-to/content/saving-and-viewing-email-attachments-in-microsoft-outlook.html, as accessed Jun. 24, 2013, (Aug. 8, 2010).

"Attachments: View, download, and save", https://support.google.com/mail/answer/30719?hl=en, as accessed Jun. 24, 2013, Google, (Apr. 12, 2013).

"Solid Documents Releases Solid Converter® 7.3", http://www.soliddocuments.com/pdf/_solid_converter_v7_3/312/1, as accessed Jun. 24, 2013, Nelson, New Zealand, (Oct. 1, 2012).

"Frank Boldewin's www.reconstructer.org", http://www.reconstructer.org/code.html, as accessed Jun. 24, 2013, (Feb. 5, 2007).

"R-Tools Technology", http://www.r-tt.com/word_recovery/, as accessed Jun. 24, 2013, (2000).

"The Undelete Company", http://the-undelete.com/promo.php, as accessed Jun. 24, 2013, (Jul. 17, 2012).

(56) References Cited

OTHER PUBLICATIONS

"The Symantec Brightmail Gateway Appliance quarantines Microsoft Office 2007 documents under the Executable File rule", http://www.symantec.com/business/support/index?page=content&id=TECH86094, as accessed Jun. 24, 2013, Article:TECH86094, Symantec Corporation, (Jan. 26, 2007).

Sanjaykumarm, "Extracting embedded spreadsheets from wordprocessingML documents", http://openxmldeveloper.org/blog/b/openxmldeveloper/archive/2007/05/10/1543.aspx, as accessed Jun. 24, 2013, (May 10 2007).

"Remove hidden data and personal information from Office documents", https://support.office.com/en-us/article/Remove-hidden-data-and-personal-information-from-Office-documents-c2499d69-413c-469b-ace3-cf7e31a85953?ui=en-US&rs=en-US&ad=US, as accessed Jun. 24, 2013, Microsoft, (on or before Jun. 24, 2013).

"Add or remove a digital signature in Office documents", https://support.office.com/en-us/article/Add-or-remove-a-digital-signature-in-Office-documents-49af4304-bfe7-41bf-99c3-a5023bdab44a?ui=en-US&rs=en-US&ad=US, as accessed Jun. 24, 2013, Microsoft, (on or before Jun. 24, 2013).

"Create, change, or delete an OLE object", https://support.office.com/en-us/article/Create-change-or-delete-an-OLE-object-f767f0f1-4170-4850-9b96-0b6c07ec6ea4?ui=en-US&rs=en-US&ad=US, as accessed Jun. 24, 2013, Microsoft, (On or before Jun. 24, 2013).

"Remove background colors, images, or text from a document", http://office.microsoft.com/en-gb/word-help/remove-background-colors-images-or-text-from-a-document-HP005189623.aspx, as accessed Jun. 24, 2013, Microsoft, (Sep. 24, 2011).

"Deployment of the Microsoft Windows Malicious Software Removal Tool in an enterprise environment", http://support.microsoft.com/kb/891716, as accessed Jun. 24, 2013, Article ID: 891716, Microsoft, (Jan. 13, 2005).

Zeltser, Lenny "Analyzing Malicious Documents Cheat Sheet", http://zeltser.com/reverse-malware/analyzing-malicious-documents.html, as accessed Jun. 24, 2013, (1995).

"Safety 101: PC Safety", http://support.kaspersky.com/viruses/disinfection/5350?el=88446, as accessed Jun. 24, 2013, Kaspersky Lab, (1997).

* cited by examiner

SYSTEMS AND METHODS FOR HEALING INFECTED DOCUMENT FILES

CROSS REFERENCE TO RELATED APPLICATION

This application claims the benefit of U.S. Provisional Application No. 61/839,363, filed 25 Jun. 2013, the disclosure of which is incorporated, in its entirety, by this reference.

BACKGROUND

Individuals and organizations generally desire to protect computing systems from malicious attacks. These malicious attacks may be targeted to document files, such as word processing document files and PORTABLE DOCUMENT FORMAT (PDF) files. Hackers and other attackers may target computing systems by exploiting vulnerabilities within document reader programs that read these document files. Moreover, these attackers may package the attacks with electronic messages to the target computing systems. Specifically, the attackers may package the attacks as attachments to emails directed to the target computing systems.

Some traditional techniques for addressing corrupted document files suffer from various deficiencies. For example, some systems may simply diagnose a document file without correcting or healing the document file, much less performing correcting or healing in a seamless and automated manner. Other systems may work directly on document files but may be inefficient (e.g., may take a large number of passes when parsing a document file).

Accordingly, the instant disclosure identifies and addresses a need for additional and improved systems and methods for healing infected document files.

SUMMARY

As will be described in greater detail below, the instant disclosure generally relates to systems and methods for healing infected document files by parsing document files, identifying potentially malicious content within the document files, healing the document files by removing the potentially malicious content, and reconstructing the document files to provide safe and healed document files. The disclosed systems and methods may provide various advantages over systems that merely diagnose corrupt document files without automatically and seamlessly correcting documenting files within incoming electronic messages (e.g., in bulk).

In one example, a computer-implemented method for healing infected document files may include (1) receiving an electronic message directed to a target client computing system, the electronic message including a document file, (2) in response to receiving the electronic message, discovering, by a security program, that the document file is infected with potentially malicious content by parsing the document file into separate objects and detecting that one of the separate objects is infected with potentially malicious content, (3) healing, by the security program, the infected object by removing the potentially malicious content from the object, (4) reconstructing, by the security program, the document file by reuniting the healed separate object with a remainder of the separate objects in a manner that preserves readability of the document, and (5) providing access to the readable reconstructed document file at the target client computing system.

In one embodiment, the electronic message may include an email, and the document file may include an attachment to the email. In some examples, receiving the electronic message may include intercepting the electronic message.

In some examples, intercepting the electronic message may include replacing the infected document file with the healed document file. In some embodiments, providing access to the readable reconstructed document file at the target client computing system may occur at the time of delivering the electronic message to the target client computing system and/or earlier than the time of delivering the electronic message to the target client computing system.

In one embodiment, the security program may be configured to perform the following, in a batch process, for each electronic message that is received over a period of time and that includes a document file detected to contain an infected object: (1) parse the document file into separate objects, (2) heal the infected object by removing the potentially malicious content from the object, (3) reconstruct the document file by reuniting the healed separate object with a remainder of the separate objects in a manner that preserves readability of the document, and (4) provide access to the readable reconstructed document file.

In some examples, providing access to the readable reconstructed document file at the target client computing system may include diminishing access to the infected document file. In some embodiments, providing access to the readable reconstructed document file at the target client computing system may include notifying the target client computing system that the document file was infected.

In one example, reconstructing the document file may include creating a new document file and writing the healed object to the new document file. According to various embodiments, the document file may be in one or more of the following formats: (1) a portable document file format, (2) a binary word processor document format, (3) an extended markup language word processor document format, (4) a presentation program document format, and/or (5) a container format that contains an embedded document file.

According to some embodiments, the document file may be in a proprietary format, and the security program may be provided by a vendor independent from a vendor that manages the proprietary format. In some examples, healing the object may include one or more of: (1) removing a sub-object from the infected object, (2) replacing the infected object with a benign object, and/or (3) converting the infected object from one file format to a different file format. In one embodiment, the document file may contain an embedded document file, and the security program may recursively parse and heal the document file and the embedded document file.

According to various embodiments, a system for implementing the above-described method may include (1) a reception module that receives an electronic message directed to a target client computing system, the electronic message including a document file, (2) a discovery module that, in response to receiving the electronic message, discovers that the document file is infected with potentially malicious content by parsing the document file into separate objects and detecting that one of the separate objects is infected with potentially malicious content, (3) a healing module that heals, by the security program, the infected object by removing the potentially malicious content from the object, (4) a reconstruction module that reconstructs, by the security program, the document file by reuniting the healed separate object with a remainder of the separate objects in a manner that preserves readability of the document, (5) a provisioning module that provides access to the readable reconstructed document file at the target client computing system, and (6) at least one processor configured to execute the reception module, the discovery module, the healing module, the reconstruction module, and the provisioning module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive an electronic message directed to a target client computing system, the electronic message including a document file, (2) in response to receiving the electronic message, discover, by a security program, that the document file is infected with potentially malicious content by parsing the document file into separate objects and detecting that one of the separate objects is infected with potentially malicious content, (3) heal, by the security program, the infected object by removing the potentially malicious content from the object, (4) reconstruct, by the security program, the document file by reuniting the healed separate object with a remainder of the separate objects in a manner that preserves readability of the document, and (5) provide access to the readable reconstructed document file at the target client computing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
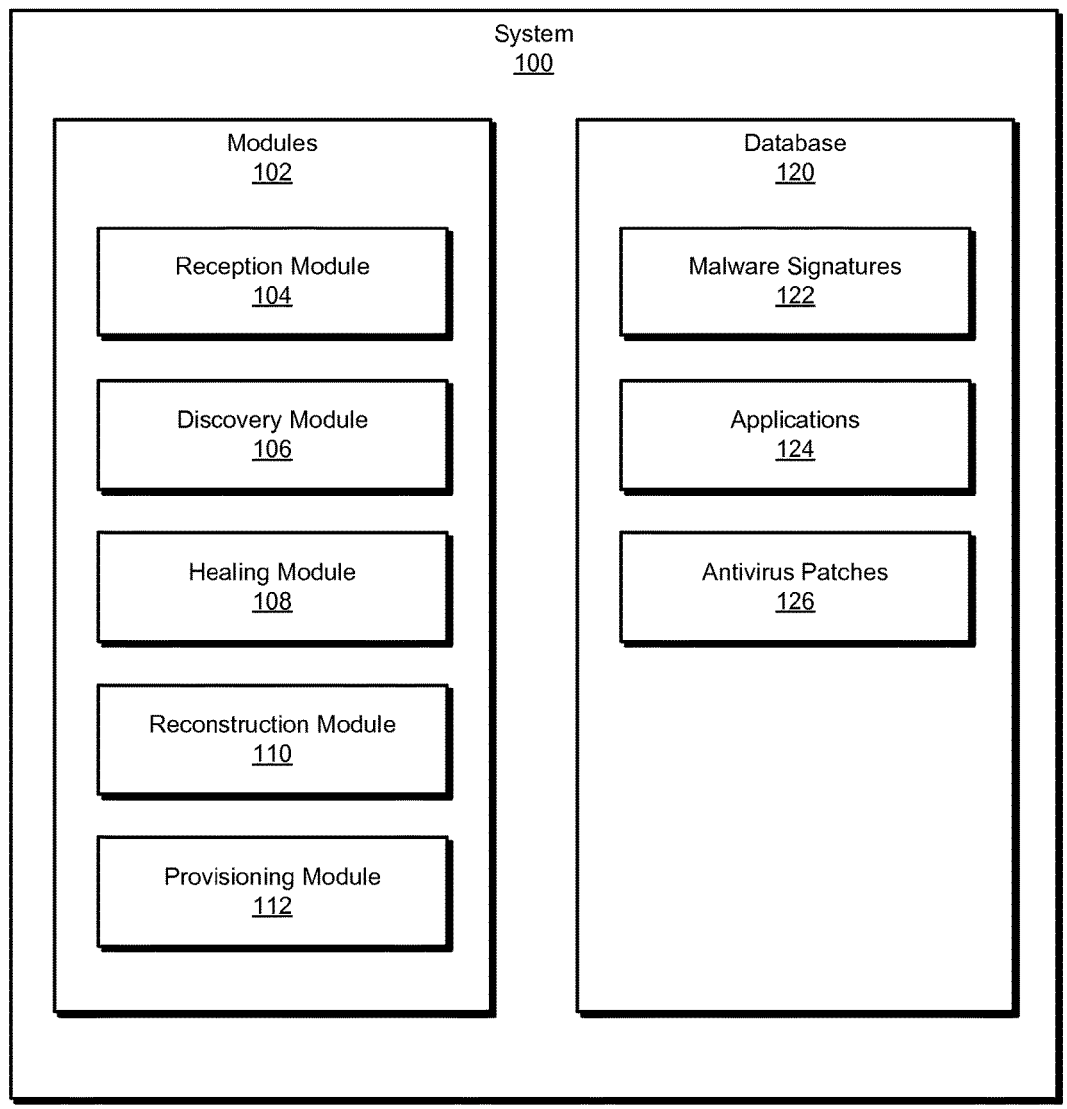
FIG. 1 is a block diagram of an exemplary system for healing infected document files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for healing infected document files. As will be explained in greater detail below, the disclosed systems and methods may provide convenient and seamless techniques for identifying malicious content in electronic messages and then automatically removing or disabling the content so that message recipients may safely read the messages. The disclosed methods and systems may also increase the accuracy and efficiency of diagnosing and healing potentially malicious content within document files.

Figure 2:
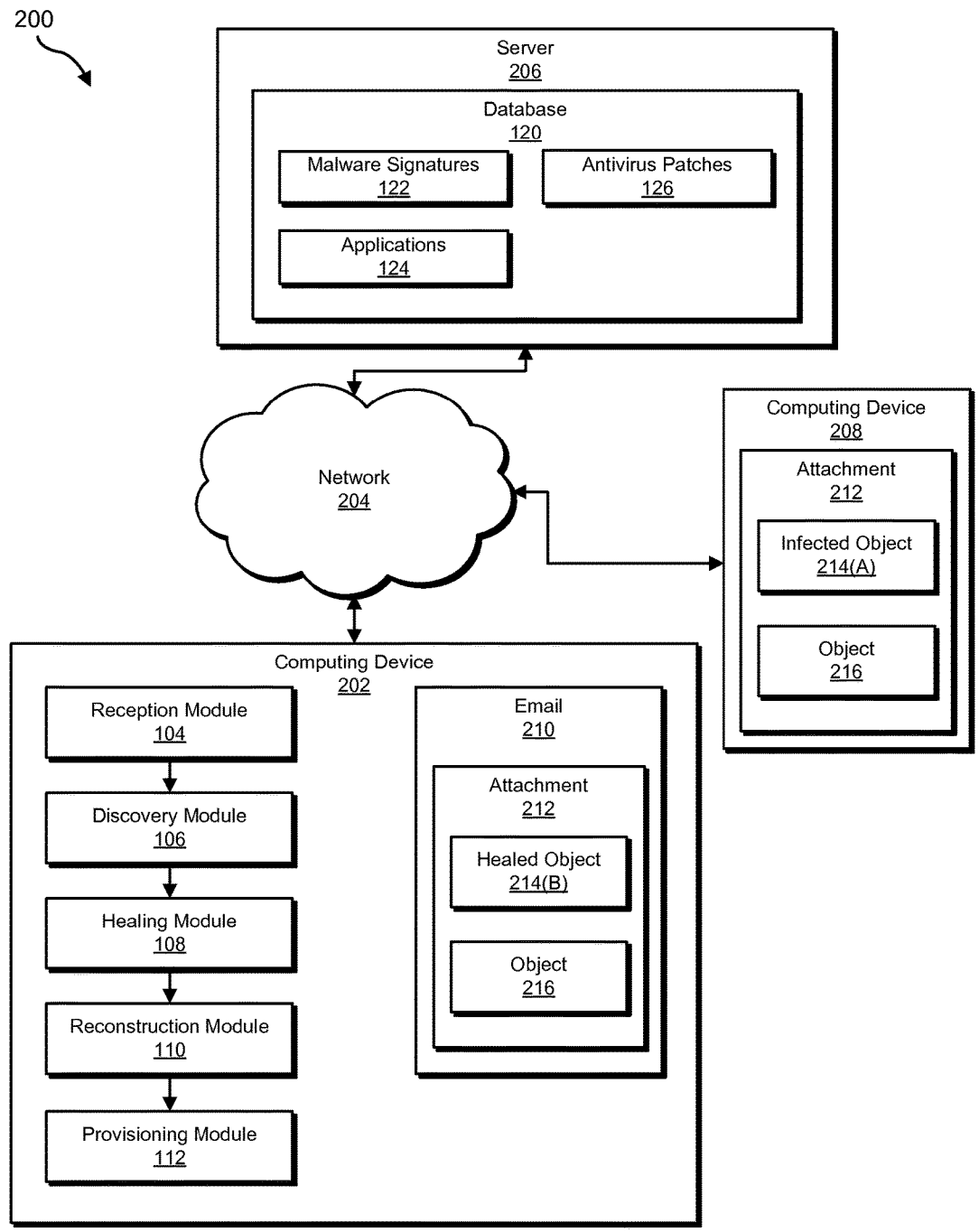
FIG. 2 is a block diagram of an exemplary system for healing infected document files.

The following will provide, with reference to FIGS. 1-2, detailed descriptions of exemplary systems for healing infected document files. Detailed descriptions of corresponding computer-implemented methods will also be provided in connection with FIG. 3. Moreover, detailed descriptions of an exemplary portable document format file will be provided in connection with FIG. 4. Furthermore, detailed descriptions of an exemplary word processing document file will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for healing infected document files. As illustrated in this figure, exemplary system 100 may include one or more modules 102 for performing one or more tasks. For example, and as will be explained in greater detail below, exemplary system 100 may include a reception module 104 that may receive an electronic message directed to a target client computing system. The electronic message may include a document file. Exemplary system 100 may additionally include a discovery module 106 that may parse the document file into separate objects and may detect that one of the separate objects is infected with potentially malicious content.

Exemplary system 100 may further include a healing module 108 that may heal the infected object by removing the potentially malicious content from the object. Moreover, exemplary system 100 may also include a reconstruction module 110 that may reconstruct the document file by reuniting the healed separate object with a remainder of the separate objects in a manner that preserves readability of the document. Lastly, exemplary system 100 may include a provisioning module 112 that may provide access to the readable reconstructed document file at the target client computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store malware signatures 122 that define and/or detect the presence of potentially malicious content within document files. Database 120 may also include applications 124, such as security or antivirus applications, that may detect matches with one or more malware signatures 122 and optionally apply solutions to heal infected document files. Database 120 may contain applications 124 themselves, for convenient access, sorting, management, and/or downloading from server 206. Alternatively, database 120 may simply contain references, pointers, locations, and/or links to applications 124. Furthermore, database 120 may include antivirus patches 126, which may be used to update applications 124.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to heal infected document files. For example, and as will be described in greater detail below, reception module 104 may be programmed to receive an electronic message, such as an email 210, directed to computing device 202. The electronic message may include a document file (e.g., attachment 212). Another computing device (e.g., computing device 208) may be the source of email 210 and attachment 212.

As shown in FIG. 2, attachment 212 in computing device 208 may contain an infected object 214(A). Attachment 212 may also contain an uninfected object 216. Within computing device 202, which may receive email 210 from computing device 208, discovery module 106 may parse attachment 212 into separate objects, such as infected object 214(A) and object 216. Discovery module 106 may parse attachment 212 in part by detecting that one of the separate objects (i.e., infected object 214(A)), is infected with potentially malicious content. Healing module 108 may heal infected object 214(A) by removing the potentially malicious content from infected object 214(A), thereby creating a healed object 214(B). Reconstruction module 110 may be programmed to reconstruct attachment 212 by reuniting healed object 214(B) with a remainder of the separate objects, such as object 216, in a manner that preserves readability of attachment 212. Provisioning module 112 may be programmed to provide access to the readable reconstructed document file at computing device 202.

One or more of modules 102 may be aggregated within a security program (e.g., as a package). Moreover, one or more modules 102 may reside within a target computing system, such as computing device 202, where an email is directed (e.g., the computing device where an email recipient receives an email as a final destination). Additionally or alternatively, one or more modules 102 may reside within server 206, such as a mail server. The modules may effectively intercept email 210, perform one or more of steps 302-308 (as discussed further below), and then complete the transmission of email 210 (in modified or unmodified form) to computing device 202, where provisioning module 112 may provide access to healed email 210. The security program may reside within a server, such as server 206, that is the same, or distinct from, a mail server that receives and delivers email. Additionally, or alternatively, server 206 may provide access to malware signatures 122, applications 124, and/or antivirus patches 126 within database 120 (which may reside within, or outside, server 206).

Computing device 202 and computing device 208 generally represent any type or form of computing device capable of reading computer-executable instructions. Examples of computing devices 202 and 208 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of providing, or executing, one or more of modules 102 and/or database 120. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
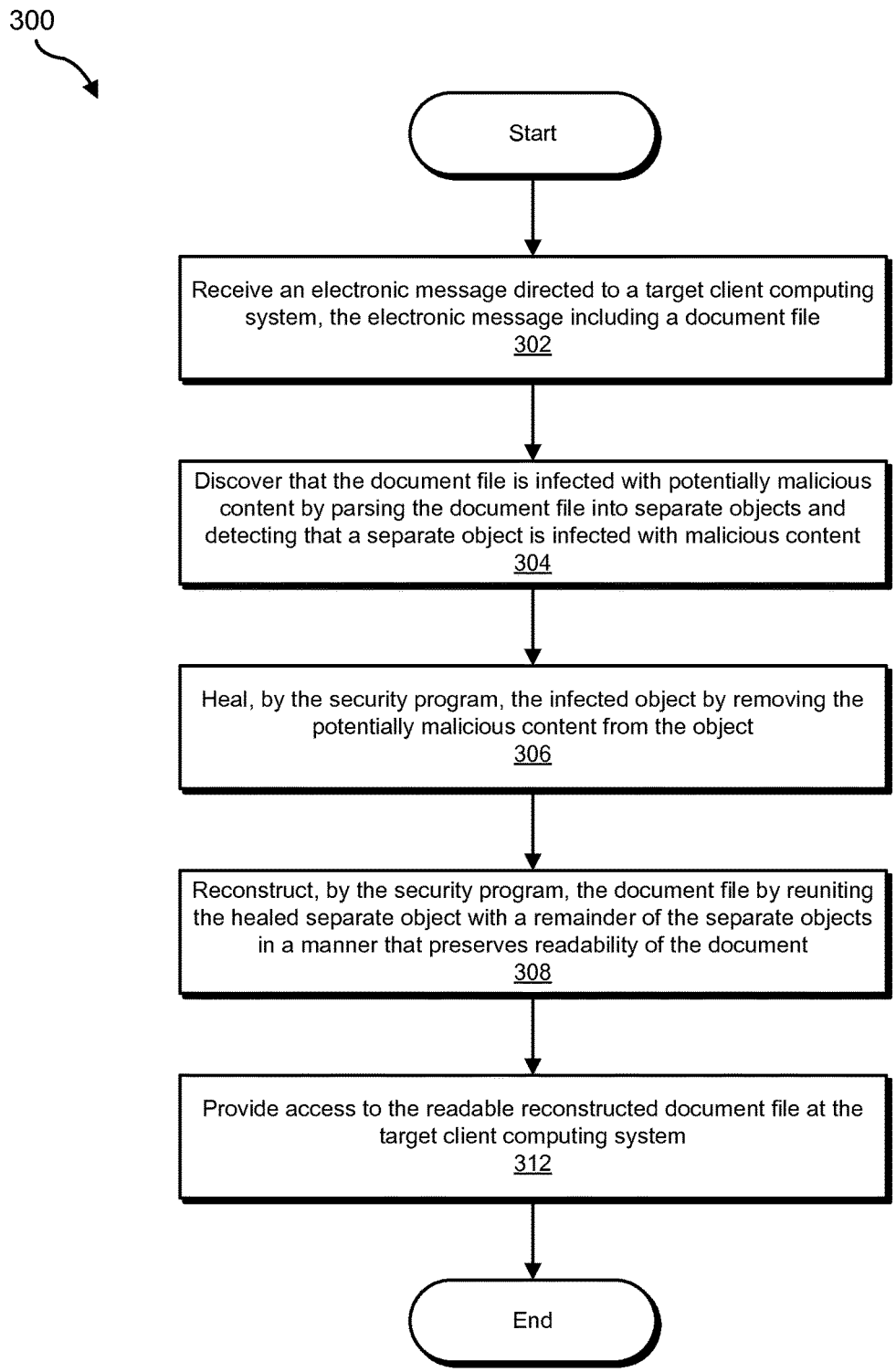
FIG. 3 is a flow diagram of an exemplary method for healing infected document files.

FIG. 3 is a flow diagram of an exemplary computer-implemented method 300 for healing infected document files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive an electronic message directed to a target client computing system, and the electronic message may include a document file. For example, at step 302 reception module 104 may, as part of computing device 202 in FIG. 2, receive email 210 directed to computing device 202. Email 210 may include a document file as attachment 212.

As used herein, the term "document file" may include any file that constitutes a document, includes pages or sheets of human readable text (e.g., as opposed to machine code in an executable file or the text that forms the image content of image files), and/or includes within the file an embedded document, pages, and/or sheets of readable text. A document file may be in any suitable format. For example, a document file may be in a portable document file (PDF) format. The document file may also be in a binary word processor document format, such as MICROSOFT WORD 2003. Additionally or alternatively, the document file may be in an extended markup language (XML) word processor document format, such as MICROSOFT WORD 2007 and subsequent versions. In some embodiments, the document file may be in a presentation program document format, such as MICROSOFT POWERPOINT. Lastly, the document file may include a container format, such as ZIP, GZIP, TAPE ARCHIVE (TAR), LHA, MULTIPURPOSE INTERNET MAIL EXTENSION (MIME), OBJECT LINKING AND EMBEDDING (OLE), UUENCODE, and ROSHAL ARCHIVE (RAR) formats. The document file may also be included in any other type of object that contains an embedded document file.

In many embodiments noted above, the document file may be in a proprietary format, such as a PDF format or a MICROSOFT WORD document format. A particular vendor may manage and/or own each proprietary format. For example, ADOBE SYSTEMS may generally manage the PDF format, and MICROSOFT may generally manage the MICROSOFT WORD document formats. In some examples, a vendor that provides a security program (e.g., a program that performs the functionality of one or more modules 102) may be distinct from a vendor that manages the proprietary format of a document file. For example, a vendor may provide a security or antivirus product. The vendor may be independent from other vendors, such as MICROSOFT or ADOBE SYSTEMS, that directly own and/or manage their proprietary document formats. The independent security or antivirus vendor may thereby provide protection from a variety of vulnerabilities that affect document reader programs that read document files in multiple, distinct (e.g., with distinct ownership) proprietary formats, without being limited to a single document file format and/or a single vendor that manages the proprietary format. The independent security vendor may enable the third party vendor to provide a greater scope of protection for a greater number of different file formats than protection provided by a single owner or manager of the owner's own proprietary document formats.

Reception module 104 may receive the electronic message in a variety of ways. In one embodiment, the electronic message may include an email, such as email 210. The document file may be included as an attachment to the email, such as attachment 212. Additionally, or alternatively, the electronic message may include a SHORT MESSAGE SERVICE message (e.g., according to an application that bundles SHORT MESSAGE SERVICE messages with attachments), a MULTIMEDIA MESSAGING SERVICE message, an instant message, a chat message, a social networking product message, and/or a web forum message. The document file may include an attachment to any of these types of messages. The document file may also include the entire electronic message (e.g., according to a file transfer program or file transfer protocol). Moreover, the document file may be embedded within a body, header, and/or metadata of the electronic message. The document file may also be stored separately or remotely from the electronic message, and the electronic message may contain an identifier and/or pointer to the document file.

In some examples, reception module 104 may be programmed to receive the electronic message in part by intercepting the electronic message. As used herein, the term "intercept" generally refers to seizing or redirecting the electronic message prior to arrival at an intended or specified destination for the purpose of antivirus or anti-malware analysis. Reception module 104 may intercept the electronic message at computing device 202 (e.g., at the destination computing device), at server 206 (e.g., at a server providing database and/or application support for protecting computing devices from malware), at a mail server, and/or at computing device 208 (e.g., at the source computing device). Moreover, reception module 104 may intercept the electronic message in part by intercepting all, some, or substantially all electronic messages transmitted and/or received by a computing device, such as computing device 202, over a period of time.

At step 304 one or more of the systems described herein may, in response to receiving the electronic message, discover that the document file is infected with potentially malicious content. For example, at step 304 discovery module 106 may, as part of computing device 202 in FIG. 2, discover that attachment 212 is infected with potentially malicious content.

As used herein, the phrase "discover a document file" generally refers to newly discovering (e.g. without a previous suspicion, indication, or reason to suspect) that a file contains potentially malicious content, as well as verifying that a file contains potentially malicious content (e.g., in response to receiving a suspicion, indication, prompt, or reason to suspect). For example, discovery module 106 may discover that an email attachment or other message contains an infected module even without first having any reason, indication, and/or suspicion that the email attachment actually does contain an infection. For example, discovery module 106 may parse all, some, or substantially all document files within a set of document files (such as all incoming emails and/or attachments received over a period of time), even when most or all of those emails are safe and non-malicious and discovery module 106 (and system 200 more generally) has no specific (i.e., specific to the particular message) reason, indication, or suspicion that any particular email contains potentially malicious content.

As used herein, the term "object" generally refers to a separate section of a document file. Examples of objects may include the header section, body section, table section, and/or trailer sections of a PDF file. Further examples may include objects (e.g., sub-objects) within the body section (or other section) of a PDF file. Further examples may also include sections or portions enclosed or defined by open and close tags or delimiters within an XML file. Another example of an "object" includes an embedded file within another document file (e.g., multimedia content) or a container object.

Moreover, as used herein, the term "potentially malicious content" generally refers to content that triggers a malware signature and/or content with a structure or markers that are associated with malware content. In some embodiments, potentially malicious content may in fact be malicious. Alternatively, potentially malicious content may appear to be malicious but may not actually constitute malware. Moreover, potentially malicious content may include content that is malformed and/or inconsistent with the document file format's specifications (e.g., including additional, or extra, characters, symbols, sections, and/or delimiters in contradiction to specifications for the document file format). Malformed documents may cause an error during parsing, as discussed further below. Furthermore, malformed documents may cause document file reader programs to crash when attempting to read the document file and/or exploit vulnerabilities in document reader programs through which malware may use the malformed document structure to drop, download, and/or execute or continue executing malware. The disclosed systems and methods may detect that that content is potentially malicious and may take one or more remedial steps to modify and/or heal the potentially malicious content (e.g., by performing a modification that removes the markers associated with malware and/or performing a procedure that would remove malware itself if present) and/or may simply block or quarantine the malformed document file without attempting to heal the document file.

Discovery module 106 may discover that a document is potentially infected with malicious content in a variety of ways. In general, discovery module 106 may parse the document file into separate objects and/or detect that one of the separate objects is infected with potentially malicious content. As used herein, the term "parse" generally refers to reading (e.g., sequentially) sections of a document file to detect a type, identity, format, location, and/or functionality of the sections. While parsing, discovery module 106 may apply the same or different algorithm to one or more sections to attempt to identify each section, a type of each section, and/or whether the section includes potentially malicious content. Discovery module 106 may also apply the same or different algorithm to one or more sections to attempt to determine an appropriate response to detecting potentially malicious software. Notably, discovery module 106 may apply (all or part of) the algorithm to a currently parsed or read section with or without having completely parsed the entire document file. For portable document format files, discovery module 106 may parse the files in at least (or only) two passes, thereby avoiding situations where (A) an object is written to a newly generated or reconstructed file but later turns out to not be used or desired and/or (B) an object is written to the newly generated or reconstructed file but later turns out to be harmful, malicious, or potentially malicious. Moreover, during parsing, discovery module 106 may create in memory one or more intermediate data structures, based on the raw document file. These intermediate data structures may include a logical tree structure, for example. The intermediate data structures may enable or enhance the efficiency and/or accuracy of analyzing and/or healing document files, as discussed further below.

Discovery module 106 may apply one or more of malware signatures 122, which may define in specific or general terms how a particular threat or exploit may infect a document file. For example, discovery module 106 may search within a PDF file for particular strings of text, such as "/JS", which may indicate JAVA SCRIPT within a PDF file, and "/S/Launch", which may indicate a launch action. These strings may constitute signatures (or be included within signatures) for potentially malicious content. The signatures may identify documents containing "/JS" or "/S/Launch" as containing potentially malicious content. Similarly, discovery module 106 may search a separate storage location for VISUAL BASIC FOR APPLICATIONS modules within an OLE file to detect the presence of a macro, which may constitute potentially malicious content. A signature may define VISUAL BASIC FOR APPLICATIONS modules containing macros as indicating the presence of potentially malicious content.

Figure 4:
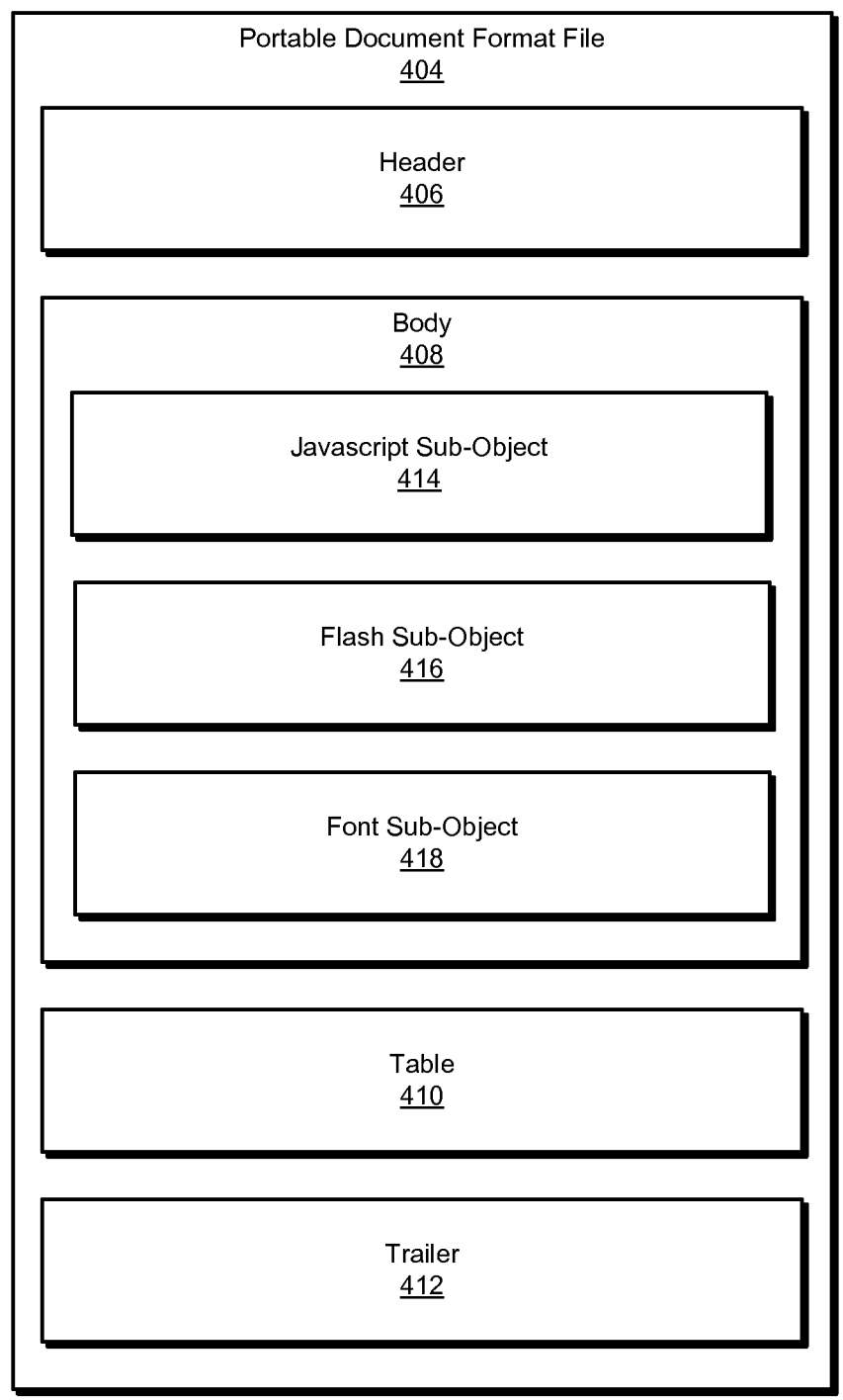
FIG. 4 is a block diagram of an exemplary portable document format file according to embodiments of the instant disclosure.
Figure 5:
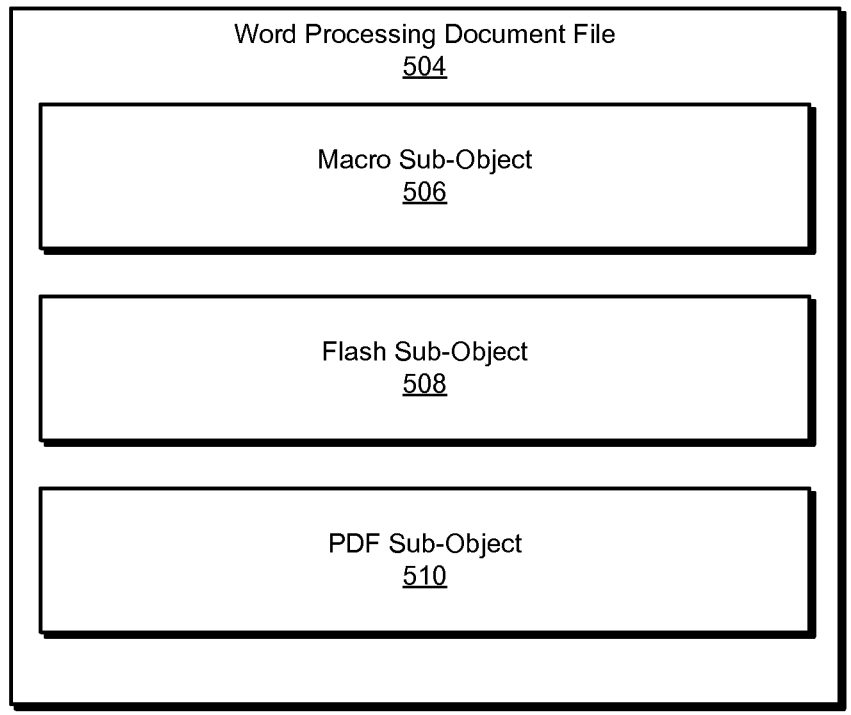
FIG. 5 is a block diagram of an exemplary word processing document file according to embodiments of the instant disclosure.

FIGS. 4 and 5 provide examples of document files, and internal objects within the document files, that the disclosed systems and methods may receive and heal. FIG. 4 shows an exemplary portable document format file 404. As shown, PDF file 404 may include higher level objects, including a header 406, a body 408, a table 410, and a trailer 412. Body 408 may also include a JAVASCRIPT sub-object 414, an ADOBE FLASH sub-object 416, and a font sub-object 418. A structure, markers, and/or delimiters indicating presence of JAVASCRIPT, FLASH, and/or a font within PDF file 404 may indicate that PDF file 404 contains potentially malicious content.

Similarly, FIG. 5 shows an exemplary word processing document file 504. As shown, word processing document file 504 may include a macro sub-object 506, an ADOBE FLASH sub-object 508, and a PDF sub-object 510. A structure, markers, and/or delimiters identifying macro sub-object 506, ADOBE FLASH sub-object 508, and/or PDF sub-object 510 may indicate that word processing document file 504 contains potentially malicious content.

At step 306 one or more of the systems described herein may heal the infected object by removing the potentially malicious content from the object. For example, at step 306 healing module 108 may, as part of computing device 202 in FIG. 2, heal infected object 214(A) by removing the potentially malicious content from infected object 214(A).

As used herein, the term "healing" generally refers to removing, inoculating, and/or otherwise disabling potentially malicious content so that any malicious content, if present, is rendered fully or partially ineffective. Healing module 108 may heal an infected object in a variety of ways. In some examples, healing module 108 may heal an infected object by removing a sub-object from the infected object. For example, healing module 108 may heal the object by removing one or more of JAVASCRIPT sub-object 414, ADOBE FLASH sub-object 416, and font sub-object 418 from portable document format file 404 in FIG. 4, or by removing one or more of macro sub-object 506, ADOBE FLASH sub-object 508, and/or PDF sub-object 510 from word processing document file 504 in FIG. 5. Additionally, or alternatively, healing module 108 may heal the infected object, including any of the objects shown in FIGS. 4 and 5, by replacing the infected object with a benign object. Healing module 108 may create the benign object by removing characters associated with malware from the infected object (e.g., by removing all characters associated with malware or removing enough characters to disable, break, or render safe the functionality of the malware).

Additionally, or alternatively, healing module 108 may use clean content from the infected object as a seed or source to generate a new object using a safe or malware free object generator. For example, a PDF file may contain an object directed to three dimensional content, and the metadata or surrounding object structure (as opposed to the three dimensional content itself) may exploit a security vulnerability in one or more document reader programs. Healing module 108 may use the three dimensional content, or any other text, auditory, visual, video, and/or multimedia content, as a seed or source to generate a new object that does not exploit the security vulnerability.

Healing module 108 may also heal the infected object by converting the infected object from one file format to a different file format. For example, healing module 108 may convert PDF sub-object 510 in FIG. 5 to another file format, such as MICROSOFT WORD. Healing module may use a safe or malware-free conversion tool or generator to convert PDF sub-object 510 into MICROSOFT WORD format, thereby cleansing the object content of malware relying on PDF-specific exploits or vulnerabilities. Optionally, healing module 108 may also reconvert the MICROSOFT WORD version of the object back to PDF format. Healing module 108 may similarly convert between different word processing document formats, different spreadsheet document formats, and different image formats (e.g., JPEG to GIF and vice versa). In general, upon discovery module 106 discovering a structure, markers, and/or delimiters associated with malware, healing module 108 may remove and/or rewrite characters and/or objects (including sub-objects) that are identified or specified by the structure, markers, and/or delimiters (e.g., within, adjacent to, and/or at a position specified by, or indicated by, the markers or delimiters) and that are known to be associated with malware.

In one embodiment, healing module 108 may heal an infected object within a file that contains an embedded document file. Healing module 108 may recursively parse and heal the file and the embedded document file. In other words, upon detecting an embedded document file within another file, healing module may recursively apply the same algorithm to the embedded document file as if the embedded document file were an original non-embedded document file (e.g., including detecting whether the embedded document file itself includes further embedded document files and applying the same algorithm to those in a recursive manner). Healing module 108 may similarly apply a recursive algorithm to objects and embedded sub-objects within other objects.

Notably, the disclosed systems and methods may also enable a user and/or administrator to configure settings for detecting potentially malicious content and/or healing document files. The disclosed systems and methods may include a graphical user interface, and/or other input interface, enabling the user and/or administrator to configure which ones of various types of potentially malicious content to detect, parse, and/or heal. For example, users may (for any reason) decline to detect and/or heal one or more types of potentially malicious content. The interface may also enable the configuration of which ones of various remedial actions to take upon detecting one or more instances of potentially malicious content, including performing, or attempting to perform, healing the document file or infected object, blocking the document file or infected object, disabling the infected object, and/or notifying one or more designated parties about the potentially malicious content. The interface may also enable the configuration of a timing, schedule, and/or interval for performing one or more steps of FIG. 3, including steps 304 and 306, as discussed above. Moreover, the interface may further enable the configuration of which computing systems, message inboxes, and/or user accounts are protected by the disclosed systems and methods, as well as identities, user names, and/or contact information for notifying one or more individuals about detections of potentially malicious content and remedial actions taken.

At step 308 one or more of the systems described herein may reconstruct the document file by reuniting the healed separate object with a remainder of the separate objects in a manner that preserves readability of the document. For example, at step 308 reconstruction module 110 may, as part of computing device 202 in FIG. 2, reconstruct attachment 212 by reuniting healed object 214(B) with a remainder of the separate objects, including object 216, in a manner that preserves readability of attachment 212.

As used herein, the term "in a manner that preserves readability of the document" refers to preserving all or substantially all text and/or functionality of the document. Certain healing processes, such as removing JAVASCRIPT and/or FLASH, may necessarily diminish and/or disable some functionality of the original infected document. Nevertheless, the healed document may retain substantially all readability, text, content, and/or functionality (e.g., the healing may be minimally invasive or disruptive by disabling only content inherently associated with malware while preserving all or substantially all readability or functionality of the document file). In many embodiments, multimedia content, such as three dimensional, image, and/or video content may be cleaned (e.g., in a file format conversion process) and reunited to preserve the content within the document.

Reconstruction module 110 may reconstruct the document file in a variety of ways. In one embodiment, reconstruction module 110 may reconstruct the document file in part by creating a new document file. Reconstruction module 110 may also reconstruct the document file in part by writing the healed object to the new document file. Reconstruction module 110 and/or healing module 108 may also reconstruct the document file by writing (e.g., overwriting) the healed object to the original infected document file. Furthermore, reconstruction module 110 may reconstruct the document file in part by reuniting a plurality of different healed objects within the reconstructed document file. Moreover, reconstruction module 110 may generate new objects, metadata, headers, tables, and/or trailers (such as header 406, table 410, and/or trailer 412) to reflect the changes between the infected object and the healed object for consistency (e.g., by removing call sites, addresses, pointers, and/or references to removed objects and/or sub-objects and/or updating locations, addresses, and/or other metadata for remaining objects and/or content).

At step 312 one or more of the systems described herein provide access to the readable reconstructed document file at the target client computing system. For example, at step 312 provisioning module 112 may, as part of computing device 202 in FIG. 2, provide access to email 210, including healed object 214(B), at computing device 202.

Provisioning module 112 may provide access to the readable reconstructed document file at the target client computing system in a variety of ways. In some examples, provisioning module 112, and/or another module (e.g., reception module 112), may intercept the electronic message in part by replacing the infected document file with the healed document file. Provisioning module 112 may thereby heal the entire electronic message and deliver the healed electronic message to the intended or specified destination. Provisioning module 112 may heal the entire electronic message with or without: (1) delivering a copy of the unhealed electronic message and/or (2) notifying the intended or specified recipient about the infection with potentially malicious content. The systems and methods disclosed herein may simply record the infection in a log. The systems and methods disclosed herein may also modify the electronic message to include a notification about the infection. The systems and methods disclosed herein may also separately notify the intended or specified recipient about the infection while diminishing or limiting access to the infected electronic message, as discussed further below.

For example, provisioning module 112 may provide access to the readable reconstructed document file at the target client computing system at the time of delivering the electronic message to the target client computing system. Additionally, or alternatively, provisioning module 112 may provide access to the readable reconstructed document file at the target client computing system at an earlier time than the time of delivering the electronic message to the target client computing system. By providing access to the readable reconstructed document file prior to (or at the same time as)

delivering the electronic message, provisioning module 112 may effectively avoid any period of vulnerability where the recipient has received the electronic message, including its original infected document file, without receiving a notification, warning, and/or healed document file. In general, provisioning module 112 may provide access to the readable reconstructed document file as part of completing delivery of the electronic message to its intended recipient or destination (e.g., within a mail server or client-side mailbox).

In one embodiment, provisioning module 112 may be configured to perform a series of one or more steps, in a batch process, for each electronic message that is received over a period of time and that includes a document file detected to contain an infected object. For example, provisioning module 112 and/or discovery module 106 may parse each document file into separate objects. Provisioning module 112 and/or healing module 108 may then heal the infected objects by removing the potentially malicious content from the objects. Moreover, provisioning module 112 and/or reconstruction module 110 may reconstruct the document files by reuniting the healed separate objects with a remainder of the separate objects in a manner that preserves readability of each document. Lastly, provisioning module 112 may provide access to each of the readable reconstructed document files. In summary, provisioning module 112, in concert with one or more modules 102, may automatically or autonomously repeat one or more of steps 302-310 for one or more electronic messages received over a period of time (e.g., a predetermined period of time set by an administrator). For example, the disclosed systems and methods may be configured to intercept and/or process all, some, or substantially all incoming emails and/or email attachments received at an email inbox and/or computing device, such as computing device 202.

In some examples, provisioning module 112 may provide access to the readable reconstructed document file at the target client computing system in part by diminishing access to the infected document file. As used herein, the term "diminishing" generally refers to limiting access scope and/or discouraging access of the infected document file. In one example, provisioning module 112 may diminish access to the infected document file in part by notifying the target client computing system (and/or user or recipient) that the document file was infected. Provisioning module 112 may also diminish access to the infected document file by replacing the infected document file with the healed document file, as discussed above. Furthermore, provisioning module 112 may, alone or in concert with one or more remaining modules 102, diminish access to the infected document file by discarding the infected document file, healing the infected document file without preserving a copy of the original infected document file, quarantining the infected document file, and/or putting in place password protection, prompts, pop-ups, warnings, and/or other barriers to accessing the infected document file.

As explained above in connection with method 300 in FIG. 3, the disclosed systems and methods may provide convenient and seamless techniques for identifying malicious content in electronic messages and automatically removing or disabling the content so that message recipients may safely read the messages. The disclosed methods and systems may also increase the accuracy and efficiency of diagnosing and healing potentially malicious content within document files.

Figure 6:
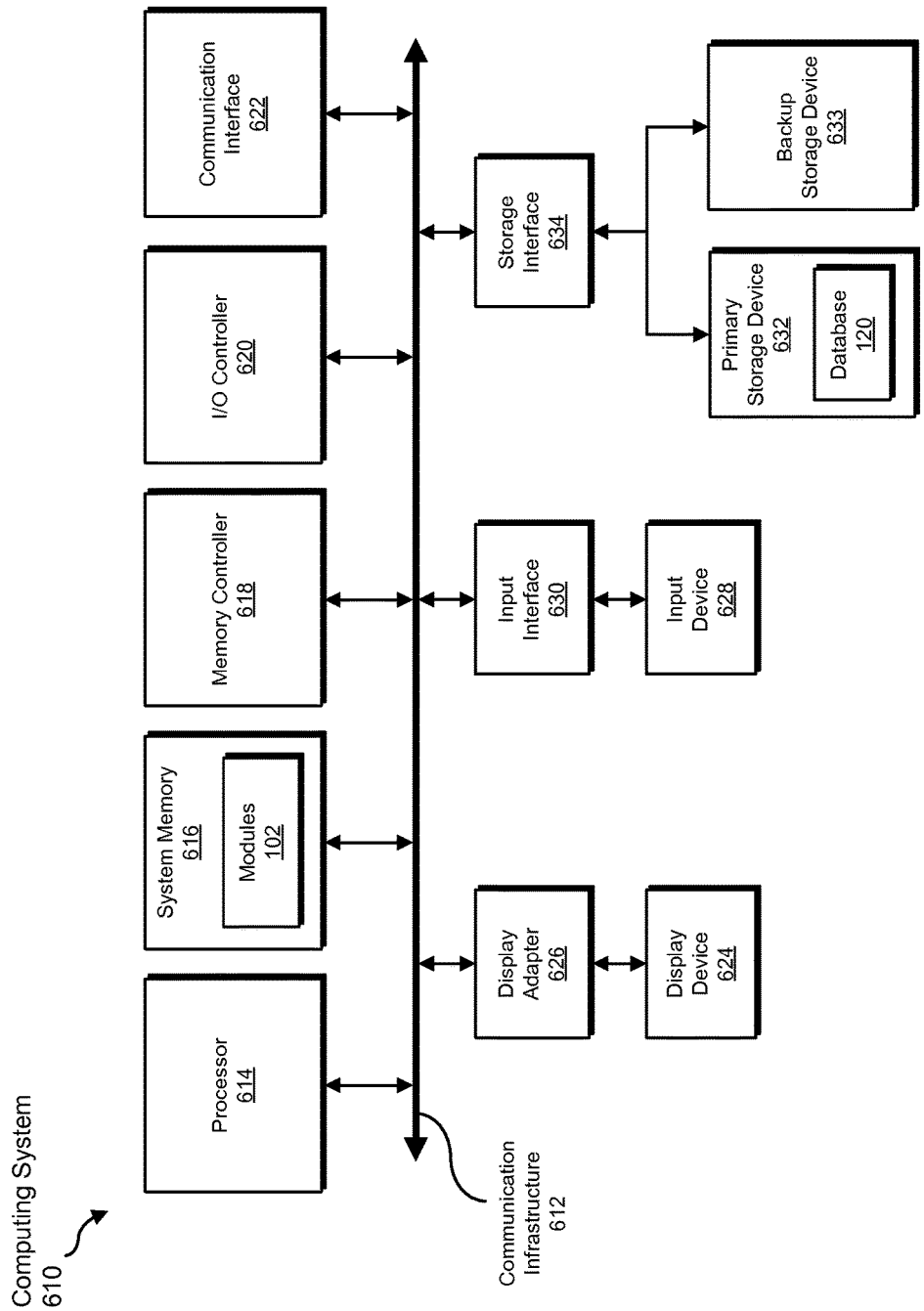
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
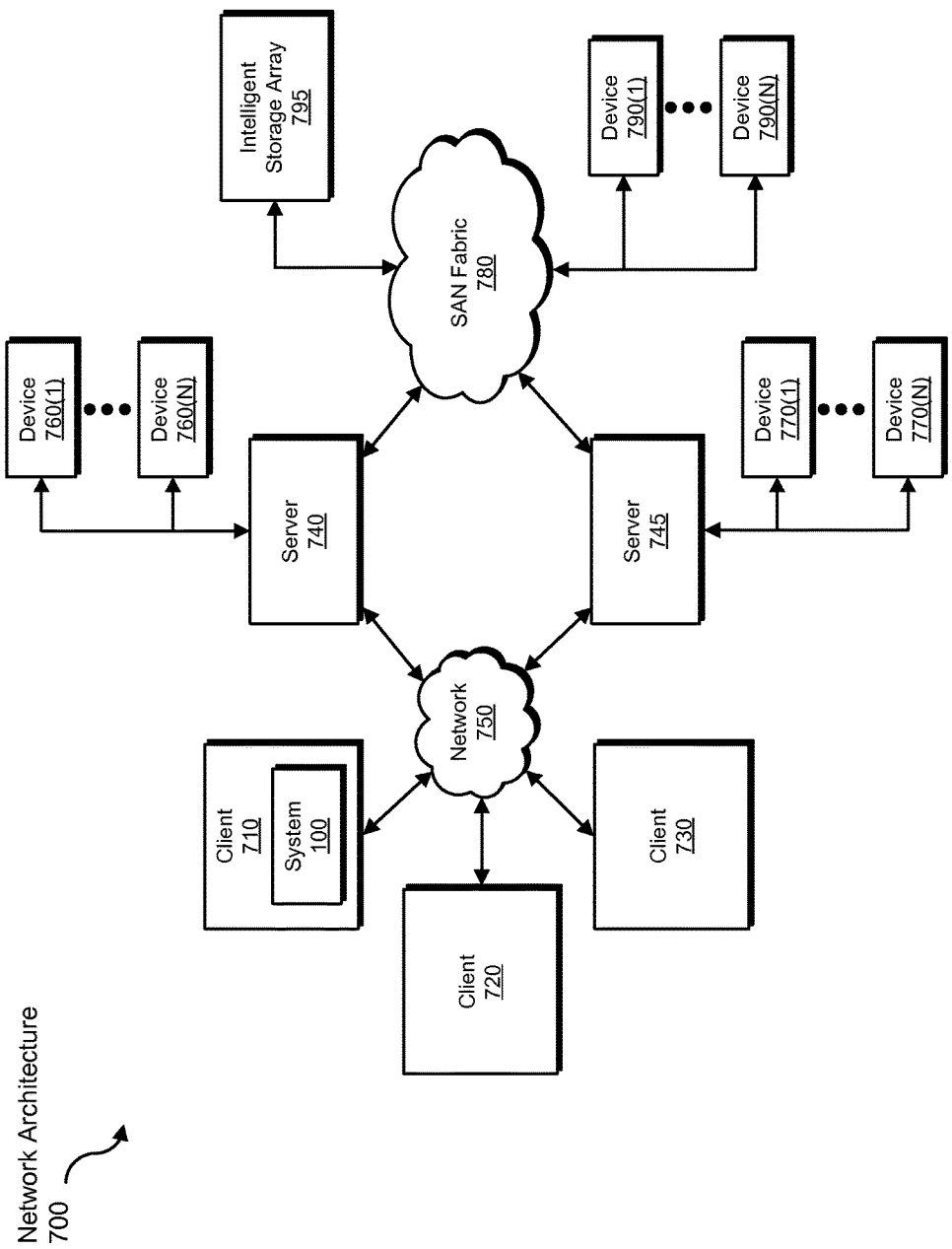
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture

700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for healing infected document files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an infected document file, including one or more infected objects, to be transformed, transform the infected document file by healing the infected document file, output a result of the transformation to a server, including a mail server, an email account, and/or a client computing device, use the result of the transformation to protect users and email recipients from malware, attacks, and document file-based exploits and vulnerabilities, and store the result of the transformation to a mail server, database, and/or computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for healing infected document files, at least a portion of the method being performed by a computing device comprising at least one processor, the method comprising:
   receiving an electronic message directed to a target recipient, the electronic message including a document file formatted in a portable document format, the document file further comprising a cross-reference table;
   in response to receiving the electronic message, discovering, by a security program in an initial pass that traverses the document file, that the document file is infected with potentially malicious content by:
   parsing the document file into separate objects; and
   detecting that one of the separate objects is infected with potentially malicious content by searching within the portable document format document file for a string of text comprising a JAVASCRIPT key;

healing, by the security program, the infected separate object by removing both the JAVASCRIPT key and a value associated with the JAVASCRIPT key;

reconstructing the document file, by the security program in a subsequent pass that traverses the document file after the initial pass, by reuniting the healed separate object with a remainder of the separate objects in a newly generated document file in a manner that preserves readability of the document file as a document; and providing access to the readable reconstructed document file at a client computing system of the target recipient.

2. The computer-implemented method of claim 1, wherein:
the electronic message comprises an email; and
the document file comprises an attachment to the email.

3. The computer-implemented method of claim 1, wherein receiving the electronic message comprises intercepting the electronic message.

4. The computer-implemented method of claim 3, wherein intercepting the electronic message comprises replacing an infected version of the document file from prior to performance of the healing with a healed version of the document file.

5. The computer-implemented method of claim 3, wherein providing access to the readable reconstructed document file at the client computing system of the target recipient occurs at one of the following times:
at a time of delivering the electronic message to the client computing system of the target recipient; and
earlier than the time of delivering the electronic message to the client computing system of the target recipient.

6. The computer-implemented method of claim 1, wherein the security program is configured to perform the following, in a batch process, for each electronic message that is received over a period of time and that includes a document file detected to contain an infected separate object:
parse the document file into separate objects;
heal the infected separate object by removing potentially malicious content from the separate object;
reconstruct the document file by reuniting the healed separate object with a remainder of the separate objects in a manner that preserves readability of the document; and
provide access to the readable reconstructed document file.

7. The computer-implemented method of claim 1, wherein providing access to the readable reconstructed document file at the client computing system of the target recipient comprises diminishing access to an infected version of the document file.

8. The computer-implemented method of claim 1, wherein providing access to the readable reconstructed document file at the client computing system of the target recipient comprises notifying the client computing system of the target recipient that the document file was infected.

9. The computer-implemented method of claim 1, wherein reconstructing, by the security program, the document file comprises:
creating a new document file; and
writing the healed separate object to the new document file.

10. The computer-implemented method of claim 1, wherein the document file is embedded within a larger file formatted in a container format.

11. The computer-implemented method of claim 1, wherein:
the document file has a proprietary format; and
the security program is provided by a vendor independent from the vendor that manages the proprietary format.

12. The computer-implemented method of claim 1, wherein healing the separate object further comprises at least one of:
removing a sub-object from the infected separate object; and
converting the infected separate object from one file format to a different file format.

13. The computer-implemented method of claim 1, wherein:
the document file contains an embedded document file; and
the security program recursively parses and heals the document file and the embedded document file.

14. A system for healing infected document files, the system comprising:
a reception module that receives an electronic message directed to a target recipient, the electronic message including a document file formatted in a portable document format, the document file further comprising a cross-reference table;
a discovery module that, in response to receiving the electronic message, discovers, as part of a security program in an initial pass that traverses the document file, that the document file is infected with potentially malicious content by:
parsing the document file into separate objects; and
detecting that one of the separate objects is infected with potentially malicious content by searching within the portable document format document file for a string of text comprising a JAVASCRIPT key;
a healing module that heals, as part of the security program, the infected separate object by removing both the JAVASCRIPT key and a value associated with the JAVASCRIPT key;
a reconstruction module that reconstructs the document file, as part of the security program in a subsequent pass that traverses the document file after the initial pass, by reuniting the healed separate object with a remainder of the separate objects in a newly generated document file in a manner that preserves readability of the document file as a document;
a provisioning module that provides access to the readable reconstructed document file at a client computing system of the target recipient; and
at least one physical processor configured to execute the reception module, the discovery module, the healing module, the reconstruction module, and the provisioning module.

15. The system of claim 14, wherein:
the electronic message comprises an email; and
the document file comprises an attachment to the email.

16. The system of claim 14, wherein the reception module receives the electronic message by intercepting the electronic message.

17. The system of claim 16, wherein the provisioning module replaces an infected version of the document file from prior to the healing module performing the healing with a healed version of the document file.

18. The system of claim 14, wherein the provisioning module provides access to the readable reconstructed document file at the client computing system of the target recipient at one of the following times:

at a time of delivering the electronic message to the client computing system of the target recipient; and earlier than the time of delivering the electronic message to the client computing system of the target recipient.

19. The system of claim 14, wherein the security program is configured to perform the following, in a batch process, for each electronic message that is received over a period of time and that includes a document file detected to contain an infected separate object:

parse the document file into separate objects;

heal the infected separate object by removing potentially malicious content from the separate object;

reconstruct the document file by reuniting the healed separate object with a remainder of the separate objects in a manner that preserves readability of the document; and provide access to the readable reconstructed document file.

20. A non-transitory computer-readable-storage medium comprising one or more computer-readable instructions that, when executed by at least one processor of a computing device, cause the computing device to:

receive an electronic message directed to a target recipient, the electronic message including a document file formatted in a portable document format, the document file further comprising a cross-reference table;

in response to receiving the electronic message, discover, by a security program in an initial pass that traverses the document file, that the document file is infected with potentially malicious content by:

parsing the document file into separate objects; and detecting that one of the separate objects is infected with potentially malicious content by searching within the portable document format document file for a string of text comprising a JAVASCRIPT key;

heal, by the security program, the infected separate object by removing both the JAVASCRIPT key and a value associated with the JAVASCRIPT key;

reconstruct the document file, by the security program in a subsequent pass that traverses the document file after the initial pass, by reuniting the healed separate object with a remainder of the separate objects in a newly generated document file in a manner that preserves readability of the document file as a document; and provide access to the readable reconstructed document file at a client computing system of the target recipient.

\* \* \* \* \*